April 5, 1949.  F. J. GRIFFIN  2,466,023
DRILL JIG
Filed Aug. 11, 1945
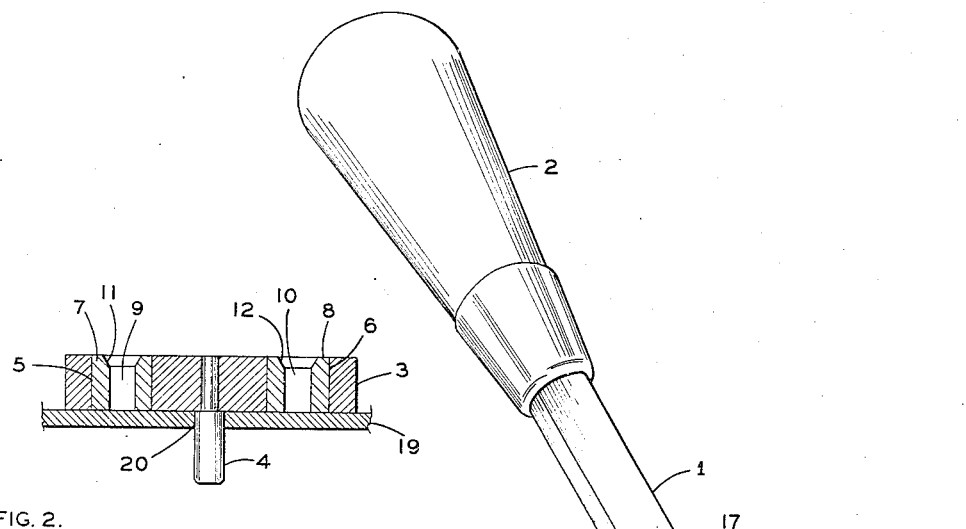
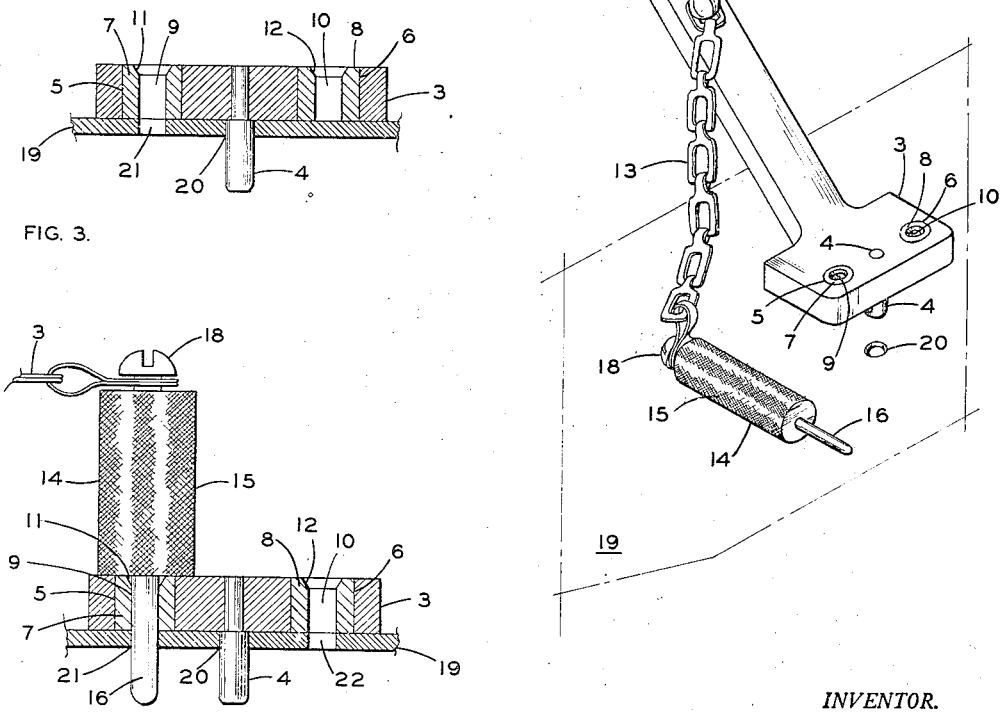
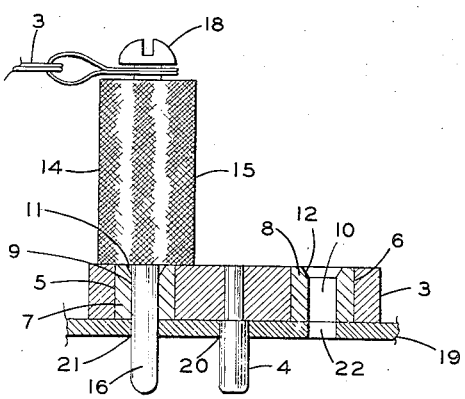
FIG. 2.
FIG. 3.
FIG. 4.
FIG. 1.
INVENTOR.
FRANCIS J. GRIFFIN.
BY
Ralph L. Chappell
ATTORNEY

Patented Apr. 5, 1949

2,466,023

UNITED STATES PATENT OFFICE 2,466,023

DRILL JIG

Francis J. Griffin, Philadelphia, Pa.

Application August 11, 1945, Serial No. 610,379

1 Claim. (Cl. 77—62)

(Granted under the act of March 3, 1883, as amended April 30, 1928; 370 O. G. 757)

This invention relates to new and useful improvements in jigs, and more particularly to drill jigs for equally spacing and accurately aligning holes or openings drilled in an object.

In numerous instances, and particularly in the aircraft industry, it is frequently required that there be drilled into or through an object a series of holes or openings which are required to be spaced and aligned with extreme accuracy. This is especially true, for example, in the case of holes or openings drilled through an object for the purpose of applying nut plates and "Dzus" fasteners thereto. Prior to the present invention not only has the time and lengthy sequence of operations required to drill an accurately spaced and aligned series of holes or openings presented a substantial problem resulting in delayed production of essential war equipment, but the extreme accuracy required for such jobs has made it substantially impossible to employ unskilled labor thereon without resulting inaccuracy in the work.

With this in mind, the principal object of the present invention is to provide a novel jig for use in drilling holes or openings in a body which are accurately aligned and spaced with respect to one another.

Another object of the invention is to provide a novel drill jig of the type described which greatly simplifies and reduces the time and operations required to drill a series of openings which are accurately aligned and spaced with respect to one another.

A further object of the invention is to provide a drill jig of the stated type which is entirely accurate and fool-proof thereby making it possible to employ unskilled labor without producing faulty or inaccurate work.

A still further object of the invention is to provide a novel drill jig having the features and characteristics set forth which is of relatively simplified and rugged construction, and substantially inexpensive to manufacture.

These and other objects of the invention, and the various features and details of the construction and use thereof, are hereinafter fully set forth and described with reference to the accompanying drawing, in which:

Fig. 1 is a view in perspective showing a drill jig made in accordance with the present invention.

Fig. 2 is an enlarged sectional view through the head of the jig showing the same associated with an object in which it is desired to drill a plurality of accurately aligned, spaced holes or openings.

Fig. 3 is a view similar to Fig. 2 showing a succeeding step in the formation of a series of drilled openings which are accurately aligned and spaced; and Fig. 4 is a view similar to Figs. 2 and 3 showing still another step in the operation and use of a drill jig embodying the present invention.

Referring now to the drawing, and more particularly to Fig. 1 thereof, a drill jig made according to the present invention may comprise an elongated body member 1 which has secured upon one end thereof a handle or hand grip 2, and which terminates at its other or opposite end in an enlarged flat head portion generally designated as 3. The head portion 3 may be angularly positioned with respect to the body member 1 as shown to facilitate handling of the jig in association with the work to be drilled.

Permanently secured in the enlarged head portion 3 of the jig so as to project perpendicularly therefrom with respect to the plane of the flat undersurface of said head portion 3 is a pin 4 the projecting portion of which has a predetermined diameter. Formed in the head 3 at opposite sides of the pin 4 are openings 5 and 6 which extend through the head 3 and have their centers or axes equally spaced and accurately aligned with respect to the center or axis of the pin 4. These openings 5 and 6 preferably have permanently secured therein tubular bushings 7 and 8, respectively, which have internal drill receiving bores 9 and 10 therethrough of the same predetermined diameter.

The bores 9 and 10 of the bushings 7 and 8, respectively, are accurately formed and machined so that the axis thereof are equally spaced and accurately aligned with respect to the axis of the pin 4, and are machined from relatively hard metals such as, for example, tool steel, to prevent distortion and wear as the result of the repeated insertion and rotation therein of power driven drills. If desired, the upper ends of the drill receiving bores 9 and 10 may be bevelled as indicated at 11 and 12, respectively, to facilitate insertion of the drills therein.

Flexibly connected to the body member 1; for example, by means of a chain or the like 13 is an aligning member 14 comprising a knurled finger grip 15 endwise from which projects a smaller pin element 16 having a diameter such as to permit said pin element 16 to be inserted through the bores 9 and 10 of the bushings 7 and 8, respectively, with an accurate relatively snug fit therein.

The chain or like flexible member 13 may be connected at one end thereof to the body 1 and at its other end to the grip 15 of the aligning member 14, for example, by means of screws or the like 17 and 18, respectively.

In using the jig of the present invention to drill a series of accurately aligned and spaced holes or openings in a member such as, for example, a sheet of metal 19, a first or pilot hole or opening 20 of desired diameter is drilled through the sheet 19 at a predetermined point (see Fig. 1). A jig made according to the present invention having a pin 4 of a diameter to accurately fit the pilot opening 20 is selected and the pin 4 thereof is inserted through said pilot opening 20 with the under surface of the jig head 3 resting upon the plate or sheet 4 in the manner more clearly shown in Fig. 2 of the drawing.

With the jig thus positioned having its pin 4 inserted through the pilot opening 20 as described, the drill is inserted through the bore of one of the bushings in the jig head 3, for example, through the bore 9 of the bushing 7, and an opening or hole 21 is drilled in the sheet 19 as shown in Fig. 3 of the drawing. The drill is then withdrawn and the pin element 16 of the aligning member 14 is inserted through the bore 9 and into the hole or opening 21 drilled through the sheet 19 in the manner and relation shown in Fig. 4 of the drawing. With the pin element 16 of the aligning member 14 thus inserted through the bushing 7 and drilled opening 21, it will be apparent that the said pin element 16 and the head pin 4 extending through the sheet openings 21 and 20, respectively, fixedly locate the other bore 10 through the bushing 8 with respect to the centers of the drilled holes or openings 21 and 20 so that another opening 22 drilled through the sheet 19 by a drill inserted through the bushing 8 will have its center or axis accurately spaced and aligned with respect to the drilled openings 21 and 20 (see Fig. 4).

By stepping the jig along one hole or opening at a time and repeating this described use of the jig, there may be drilled into an object any desired length series of openings that will be accurately spaced and aligned with respect to one another. In this event, of course, the diameter of the bores 9 and 10 through the bushings 7 and 8 must be equal to the diameter of the pilot pin 4 to permit the latter to be progressively stepped along the series of openings being drilled. On the other hand, where the jig is not to be stepped along and an object is to be provided with drilled openings conforming to the jig openings at but one setting thereof, the pilot pin 4 need not be the same diameter as the bores through the drill bushings which may be larger or smaller than the diameter of the pilot pin 4 as required or desired. Furthermore, it will be apparent that in lieu of a single drill opening through the jig head 3 at opposite sides of the pilot pin 4 as shown, there may be provided at each side of the pilot pin 4 two, three, four, or more, drill openings and bushings in accordance with the requirements of the work to be performed by or with a particular jig, it being pointed out that a number of jigs are provided having pins and openings of various sizes and combinations of sizes to meet the general run of work requirements.

From the foregoing description it will be apparent that the present invention provides a novel drill jig for use in drilling holes in an object which are accurately spaced and aligned with respect to one another. The invention also provides a novel jig which greatly reduces and simplifies the time and operations otherwise required to form accurately spaced and aligned openings in a member, and which is entirely fool-proof in use thereby making it possible to employ unskilled labor without producing faulty or inaccurate work. Furthermore, the invention provides a novel jig for drills having the described features and characteristics which is of relatively simplified and rugged construction, and substantially inexpensive to manufacture.

While a particular embodiment of the present invention has been illustrated and described herein, it is not intended to limit the invention to such disclosure, and changes and modifications may be made therein and thereto within the scope of the claim.

The invention described herein may be manufactured and used by or for the Government of the United States of America for governmental purposes without the payment of any royalties thereon or therefor.

I claim:

A drill jig comprising an elongated body member having at one end a handle and at its other end an enlarged head disposed at an angle with respect to said body member, said head having a plane surface portion arranged to rest upon the surface of an object to be drilled, a pilot pin of predetermined diameter secured in said head and projecting perpendicularly from the plane surface portion thereof to engage a pilot opening of similar size formed in the object, said head also having therethrough a plurality of openings of predetermined diameter arranged at opposite sides of the pilot pin therein with their axes disposed parallel to the axis of said pilot pin and accurately spaced and aligned with respect thereto, tubular bushings secured in said openings and providing drill openings of predetermined diameter through the head having their axes parallel to and accurately spaced and aligned with respect to the pilot pin, and an aligning member permanently associated with the jig having a pin element of a diameter substantially the same as the diameter of said drill openings in the bushings arranged to be removably inserted accurately through a first of said drill openings and into an aligned opening drilled in the object to thereby fixedly position a second drill opening in the head so that a drill inserted through said second opening may form another opening in the object that is accurately spaced and aligned with the openings in which said pilot pin and pin element are inserted.

FRANCIS J. GRIFFIN.

REFERENCES CITED

The following references are of record in the file of this patent:

UNITED STATES PATENTS

| Number | Name | Date |
| --- | --- | --- |
| 437,796 | Preston | Oct. 7, 1890 |
| 683,664 | Schramek | Oct. 1, 1901 |
| 833,917 | Burchardi | Oct. 23, 1906 |
| 1,946,421 | Brown | Feb. 6, 1934 |
| 1,984,387 | Turner | Dec. 18, 1934 |
| 2,029,650 | Betz | Feb. 4, 1936 |
| 2,373,918 | Schoeniger | Apr. 17, 1945 |
| 2,404,456 | Pierce | July 23, 1946 |